L. T. SMITH.
Machine for Sewing Covered Nuts.
No. 213,462. Patented Mar. 18, 1879.
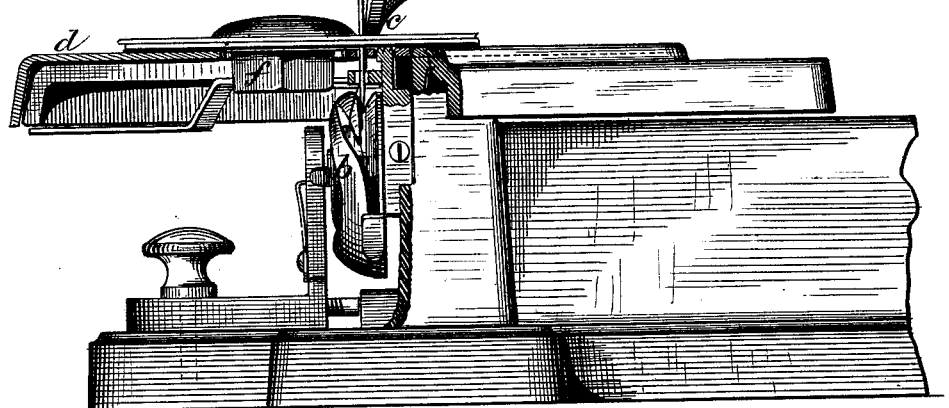
Fig. 1.
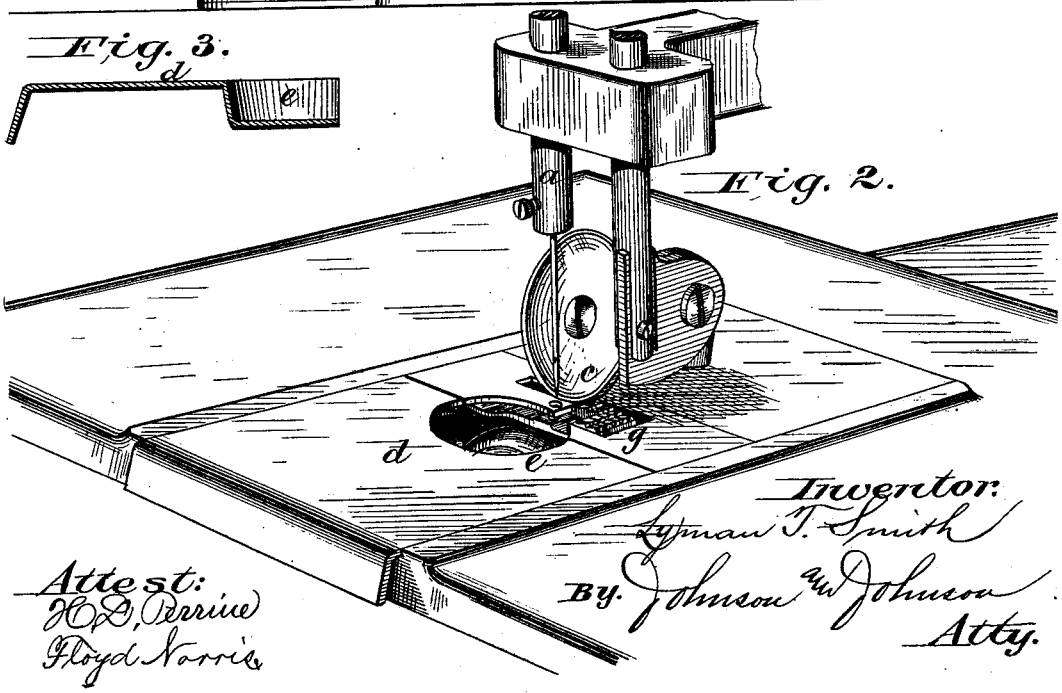
Fig. 3.
Fig. 2.
Inventor:
Lyman T. Smith
By Johnson and Johnson
Atty.
Attest:
H. D. Perrine
Floyd Norris

UNITED STATES PATENT OFFICE.

LYMAN T. SMITH, OF NEW HAVEN, CONNECTICUT.

IMPROVEMENT IN MACHINES FOR SEWING COVERED NUTS.

Specification forming part of Letters Patent No. 213,462, dated March 18, 1879; application filed January 14, 1879.

*To all whom it may concern:*

Be it known that I, LYMAN T. SMITH, of New Haven, in the county of New Haven and State of Connecticut, have invented certain new and useful Improvements in Machines for Sewing Covered Nuts, of which the following is a specification:

The invention relates to the cloth-plate of a sewing-machine, in which provision is made for adapting it for stitching leather-covered nuts for carriage-tops, and particularly of the kind patented to me January 16, 1877, in which a metallic binder is secured to the back of the cover, and in which the nut has a screw-threaded socket and a head, over which the material is placed so as to cover it, leaving the nut portion uncovered for screwing upon the joint-bolt.

The means for adapting the machine for this kind of work consists of a centering-guideway opening or depression in the cloth-plate to receive the nut proper, and support its covered head upon the cloth-plate in such relation to the needle, the needle-hole in the cloth-plate, and the feed device as to bring the circle for the stitching always at the proper point, while the nut extends to one side of the lower thread, so that the action of the feed device causes the nut to be centered and revolve within the guideway during the operation of sewing on the cover.

The guideway is placed in such relation to the needle-hole as to bring the action of the needle as near the circumference of the guideway as possible, and the feed-bar in position tangential to said guideway, so as to give the desired rotary movement to the nut.

In the accompanying drawings, Figure 1 represents a partial sectional view of so much of a sewing-machine as embraces my invention, showing the covered nut in place for being stitched; Fig. 2, a view, in perspective, of the same, the covered nut being removed to show its centering-guideway and the relation thereof to the operating parts; and Fig. 3, a portion of the cloth-plate, showing the centering-guideway in the form of a countersink or pocket for the nut.

I have shown my improvement as applied to a Wheeler & Wilson machine, in which the needle-bar *a* works in vertical guides, and in which the lower thread is carried by a rotating hook, *b*, and a reciprocating feed-bar is used in connection with a circular presser-foot, *c*. In proper relation with these parts and with the feed device I form in the cloth-plate *d* a guideway, *e*, which may be either an opening or a countersink, adapted to receive the nut part *f*, and allow its covered head to rest upon said plate. This guideway allows the feed device to give the nut a rotary movement, and thus, while allowing the nut to set low down to support its covered head upon the plate, serves the important function of centering the nut, so as to bring the line of stitching always within the circle. This is effected by having the guideway arranged so as to bring its circumference very near the needle-hole, and the latter between the guideway and the feed-bar *g*, the position of which will be tangential to the circumference of said guideway, so that the reciprocating movement of the feed-bar will revolve the covered nut within its centering-way.

I prefer to make the centering-way for the nut annular; but it may be made many-sided, so long as it is adapted for giving freedom to the feed of the nut within a circle. The centering-way thus arranged in relation to the needle and the feed device brings the nut beneath the cloth-plate to one side of the rotating hook, and out of the way of its thread.

It will be seen that the relation of the centering-way for the nut to the feed device causes the reciprocating motion of such device to give a rotary motion to the nut to feed it properly under the needle.

The cloth-plate has the usual slide-section, and the centering-guideway for the nut is formed of the two parts where they join.

I claim—

In a machine for stitching covered nuts, the combination, with the needle, the feed device, the rotating hook, and the presser-foot, of a centering way or guide for the nut formed in the cloth-plate, and having the described relation to the foregoing parts, whereby the covered nut being stitched is supported upon the cloth-plate, and the socket part of said nut set within and centered by the guideway, to effect its rotary feed under the needle by the reciprocating movement of the feed-bar, substantially as herein set forth.

In testimony whereof I have hereunto set my hand in the presence of two witnesses.

LYMAN T. SMITH.

Witnesses:
JULIUS TWISS,
AHREM M. HAHNES.